(12) United States Patent
Winter et al.

(10) Patent No.: US 7,955,740 B2
(45) Date of Patent: Jun. 7, 2011

(54) FUEL CELL STACK AND HYDROGEN SUPPLY INCLUDING A POSITIVE TEMPERATURE COEFFICIENT CERAMIC HEATER

(75) Inventors: Franz Winter, Mainz (DE); Stefan Nettesheim, Frankfurt (DE)

(73) Assignee: GM Global Technology Operations LLC, Detroit, MI (US)

( * ) Notice: Subject to any disclaimer, the term of this patent is extended or adjusted under 35 U.S.C. 154(b) by 1318 days.

(21) Appl. No.: 11/467,574

(22) Filed: Aug. 28, 2006

(65) Prior Publication Data
US 2008/0050627 A1 Feb. 28, 2008

(51) Int. Cl.
*H01M 8/04* (2006.01)
(52) U.S. Cl. ........ 429/400; 429/408; 429/434; 429/435; 429/457; 429/468; 429/514; 392/468; 392/469; 392/479
(58) Field of Classification Search .................. 219/553; 239/135; 338/22 R; 392/468, 469, 479
See application file for complete search history.

(56) References Cited

U.S. PATENT DOCUMENTS

| | | | | |
|---|---|---|---|---|
| 4,870,249 | A | * | 9/1989 | Kayanuma et al. ........... 219/206 |
| 7,203,419 | B2 | * | 4/2007 | Malone et al. ................ 392/468 |
| 2005/0002797 | A1 | * | 1/2005 | Morishima .................... 417/182 |
| 2005/0058865 | A1 | * | 3/2005 | Thompson et al. ............. 429/26 |
| 2006/0283849 | A1 | * | 12/2006 | Sakurai et al. ............. 219/444.1 |
| 2007/0212037 | A1 | * | 9/2007 | Koenekamp et al. ......... 392/468 |

FOREIGN PATENT DOCUMENTS

JP 2005-050626 * 2/2005

* cited by examiner

*Primary Examiner* — Ula C Ruddock
*Assistant Examiner* — Amanda Barrow
(74) *Attorney, Agent, or Firm* — John A. Miller; Miller IP Group, PLC

(57) ABSTRACT

A fuel cell system that employs one or more PTC ceramic heaters that do not need to be self-regulated, and thus will not require various control components, such as temperature sensors. The PTC ceramic heaters include a ceramic material that is designed for a particular temperature depending on the particular application. An electrical current is applied to the ceramic heater that generates heat as long as the temperature of the ceramic heater is below the designed temperature. If the ceramic heater reaches the designed temperature, then the resistance of the ceramic material goes up, and the current through the ceramic material goes down, so that the heater does not provide significant heating. Therefore, it does not need to be regulated.

18 Claims, 2 Drawing Sheets

FUEL CELL STACK AND HYDROGEN SUPPLY INCLUDING A POSITIVE TEMPERATURE COEFFICIENT CERAMIC HEATER

BACKGROUND OF THE INVENTION

1. Field of the Invention

This invention relates generally to a fuel cell system employing one or more positive temperature coefficient (PTC) ceramic heater and, more particularly, to fuel cell system employing PTC ceramic heaters in the end plates of a fuel cell stack and/or a hydrogen supply line for a compressed hydrogen storage tank.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membrane within a fuel cell needs to have a certain relative humidity so that the ionic resistance across the membrane is low enough to effectively conduct protons. This humidification may come from the stack water by-product or external humidification. The flow of the reactant gas through the flow channels has a drying effect on the membrane, most noticeably at an inlet of the flow channels. Also, the accumulation of water droplets within the flow channels from the membrane relative humidity and water by-product could prevent reactant gas from flowing therethrough, and cause the cell to fail, thus affecting the stack stability. The accumulation of water in the reactant gas flow channels is particularly troublesome at low stack output loads.

The end cells in a fuel cell stack typically have a lower performance than the other cells in the stack. Particularly, the end cells are exposed to ambient temperature, and thus have a temperature gradient that causes them to operate at a lower temperature as a result of convective heat losses. Because the end cells are typically cooler than the rest of the cells in the stack, water vapor more easily condenses into liquid water so that the end cells have a higher relative humidity, which causes water droplets to more readily form in the flow channels of the end cells. Further, at low stack load, the amount of reactant gas flow available to push the water out of the flow channels is significantly reduced. Also, at low stack loads the temperature of the cooling fluid is reduced, which reduces the temperature of the stack and typically increases the relative humidity of the reactant gas flow.

It is known in the art to heat the end cells with resistive heaters so as to compensate for convective heat losses. These known systems typically attempted to maintain the end cell temperature the same as the other cells in the stack by monitoring the temperature of the cooling fluid out of the stack. However, lower cell voltages for the end cells are still a problem even with the addition of such heaters.

Typically hydrogen is stored in a compressed gas tank under high pressure on the vehicle to provide the hydrogen necessary for the fuel cell system. The pressure in the compressed tank can be upwards of 700 bar. In one known design, the compressed tank includes an inner plastic liner that provides a gas tight seal for the hydrogen, and an outer carbon fiber composite layer that provides the structural integrity of the tank. At least one pressure regulator is typically provided that reduces the pressure of the hydrogen within the tank to a pressure suitable for the fuel cell system.

As the hydrogen is removed from the compressed gas tank, the pressure of the hydrogen in the tank decreases. When the pressure of a gas is reduced and the volume does not change, the temperature of the gas will also decrease. If the rate of the hydrogen flowing out of the tank is high enough and/or the temperature of the environment is low enough, the temperature in the tank can fall below 0° C. The low temperature of the hydrogen flowing from the tank may have adverse effects on the various components in the fuel cell system that receive the hydrogen, such as components in the fuel cell stack.

SUMMARY OF THE INVENTION

In accordance with the teachings of the present invention, a fuel cell system is disclosed that employs one or more PTC ceramic heaters that do not need to be self-regulated, and thus will not require various control components, such as temperature sensors. The PTC ceramic heaters include a ceramic material that is designed for a particular temperature depending on the particular application. An electrical current is applied to the ceramic heater that generates heat as long as the temperature of the ceramic heater is below the designed temperature. If the ceramic heater reaches the designed temperature, then the resistance of the ceramic material goes up, and the current through the ceramic material goes down, so that the heater does not provide significant heating. Therefore, it does not need to be regulated.

In one particular application, a plurality of PTC ceramic heaters are positioned in end plates of a fuel cell stack in the fuel cell system to provide heat to the fuel cell stack at cold start-ups, and control the temperature of the end cells of the fuel cell stack during stack operation so as to reduce water accumulation in the cathode and anode flow channels in the end cells and increase stack performance. In another application, ceramic heaters are formed in the shape of rings, and thermally coupled to a hydrogen supply line from a compressed hydrogen tank. For those operating conditions where the hydrogen supply may be very cold, possibly causing damage to the fuel cell stack, the ceramic heater rings will provide heat to increase the temperature of the hydrogen to the designed temperature.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system employing one or more PTC ceramic heaters in the end plates of a fuel cell stack and/or around a hydrogen reactant gas supply line is merely exemplary in nature, and is in no way intended to limit the invention or its applications or uses.

Figure 1:
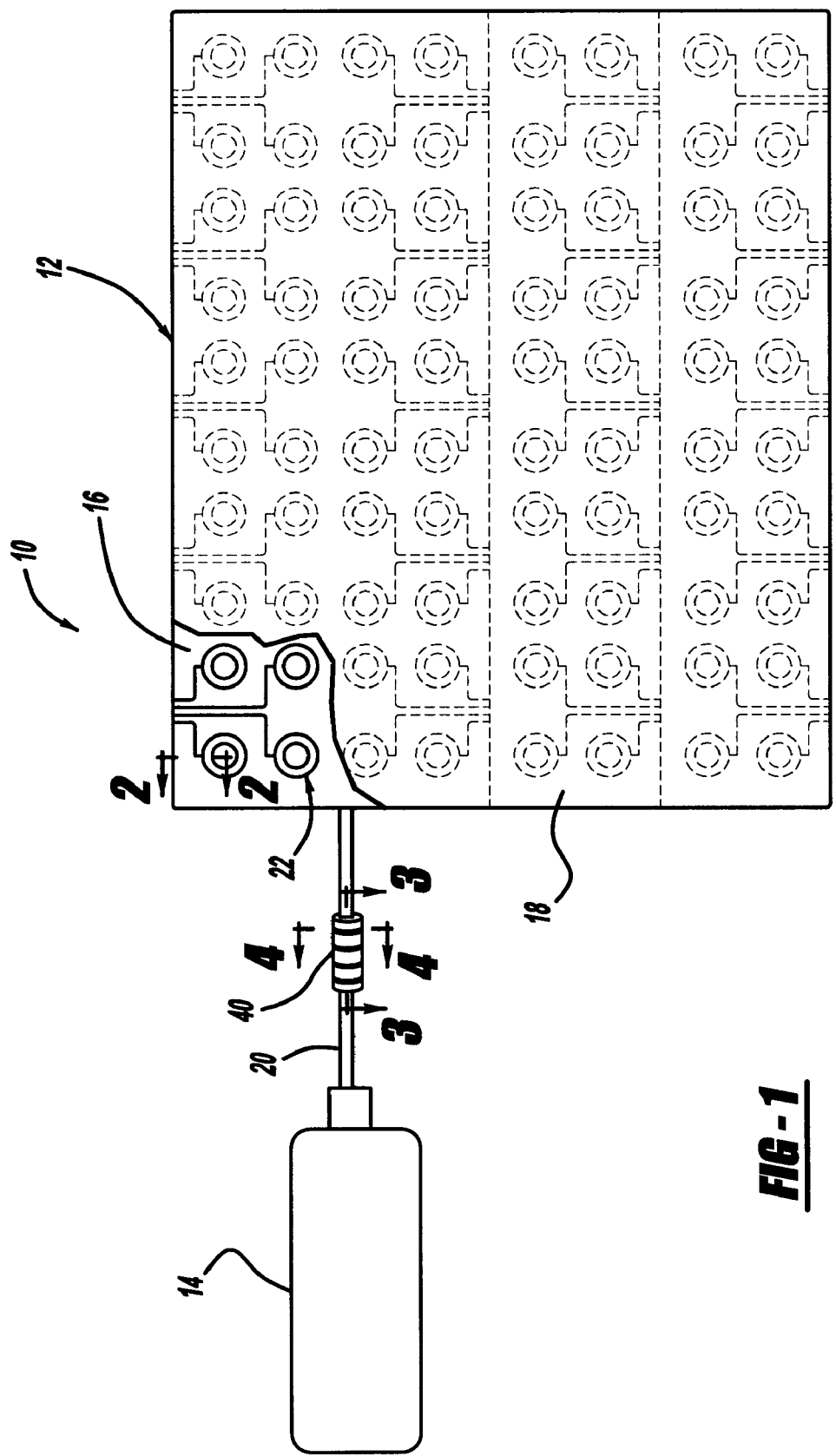
FIG. 1 is a plan view of a fuel cell system that employs PTC ceramic heaters, according to an embodiment of the present invention.

FIG. 1 is a plan view of a fuel cell system 10 employing a fuel cell stack 12 and a compressed hydrogen storage tank 14. In this view, the fuel cell stack 12 is shown from an end, where the fuel cell stack 12 includes an inner end plate 16 and an outer end plate 18, shown broken away. According to the invention, a plurality of PTC ceramic ring heaters 22 are positioned between the plates 16 and 18. Although the ceramic ring heaters 22 are positioned between the end plates 16 and 18 in this embodiment, in other embodiments, PTC ceramic heaters can be positioned at any suitable or desirable location within the housing of the fuel cell stack 12. A hydrogen gas supply line 20 is coupled to the tank 14 and the anode side of the fuel cell stack 12. The various pressure regulators, sensors, valves, etc. typically employed in the anode supply sub-system of a fuel cell system are not shown in that they are not necessary for a proper understanding of the invention.

Figure 2:
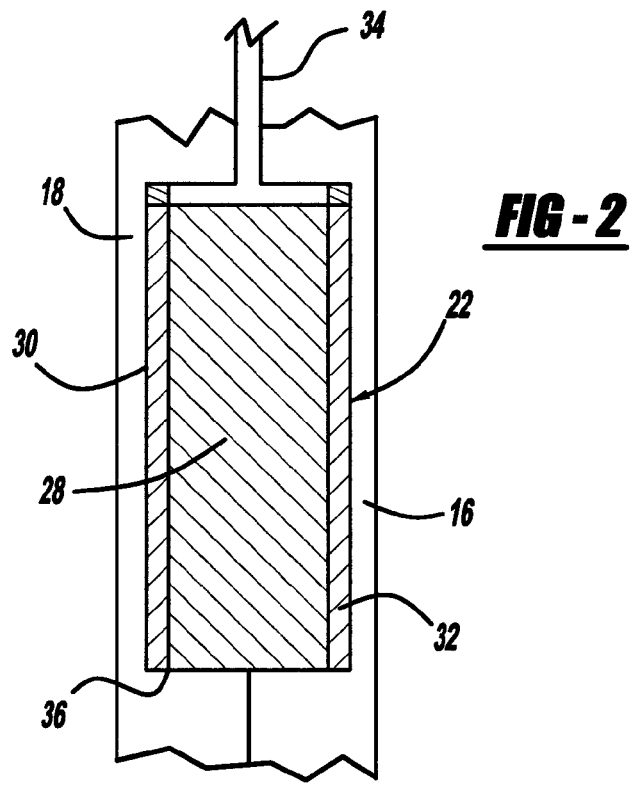
FIG. 2 is a cross-sectional view of one of the PTC ceramic heater shown in FIG. 1 through line 2-2 positioned between housing end plates of the fuel cell stack.

FIG. 2 is a cross-sectional view of one of the PTC ceramic ring heaters 22 through line 2-2 in FIG. 1. The heater 22 includes a PTC ceramic body 28, a first electrode 30 on one side of the body 28 and a second electrode 32 on an opposite side of the body 28. An electrical cable 34 is electrically coupled to the electrodes 30 and 32 to deliver a DC current flow to the ceramic body 28, as would be well understood to those skilled in the art. As shown, the ceramic ringer heater 22 is positioned between the plates 16 and 18. A recess 36, or other suitable indentation, can be provided for the heaters 22 by any suitable technique. In one embodiment, a stamped or molding process forms the recesses 36. The electrodes 30 and 32 can be any electrodes suitable for the purposes described herein, such as silver contact electrodes.

As discussed above, the composition of the ceramic material for a PTC ceramic heater can be designed so that it constantly provides heat if the temperature of the ceramic body 28 is at or below the design temperature. For example, it may be desirable to maintain the temperature of the end cells in the fuel cell stack 12 at the highest operating temperature of the fuel cell stack, such as 80° C. However, the gas transition temperature of various stack elements, such as the fuel cell membranes, may be about 90° C. The ceramic body 28 can be designed so that as long as the temperature is at or below 80° C., the ceramic heater 22 will provide heat. However, if the temperature of the ceramic body 28 goes above 80° C., the resistance of the ceramic body 28 increases rapidly, where the current provided on the cable 34 will be reduced, thus reducing the amount of heat that the heater 22 provides. Therefore, temperature sensors and other control and regulating components do not need to be employed because the heaters 22 are self regulating.

PTC ceramic heaters offer a number of advantages in this application. Particularly, they provide a small package, they heat up very quickly and the ceramic material is relatively inexpensive. In one non-limiting embodiment for this application, the ring heaters 22 may have an outer diameter in the range of 10-20 mm, and the distance between the heaters 22 in the end plates 16 and 18 can be about 20 mm. Further, the thickness of the ceramic body 28 can be about 5 mm. However, as will be appreciated by those skilled in the art, the size, thickness and shape of the ceramic heaters 22 would depend on several factors, such as the heat transfer capability of the end plates 16 and 18.

Returning to FIG. 1, a PTC heater assembly 40 is provided around the supply line 20 to heat the hydrogen gas from the compressed tank 14 before it reaches the fuel cell stack 12. As discussed above, hydrogen gas that is released from the compressed tank 14 will decrease in temperature because of the pressure drop from the tank 14 to the supply line 20. If the load on the stack 12 is high and/or the ambient temperature is low, the temperature of the hydrogen gas flow may be low enough to damage some components in the stack 12. Therefore, it is known in the art to employ a heater in the hydrogen supply line 20, typically proximate the compressed tank 14. However, the known heaters used for this purpose typically were electric heaters that required one or more temperature sensors and a controls system to control the current flow to the heater to provide the desired temperature.

Figure 3:
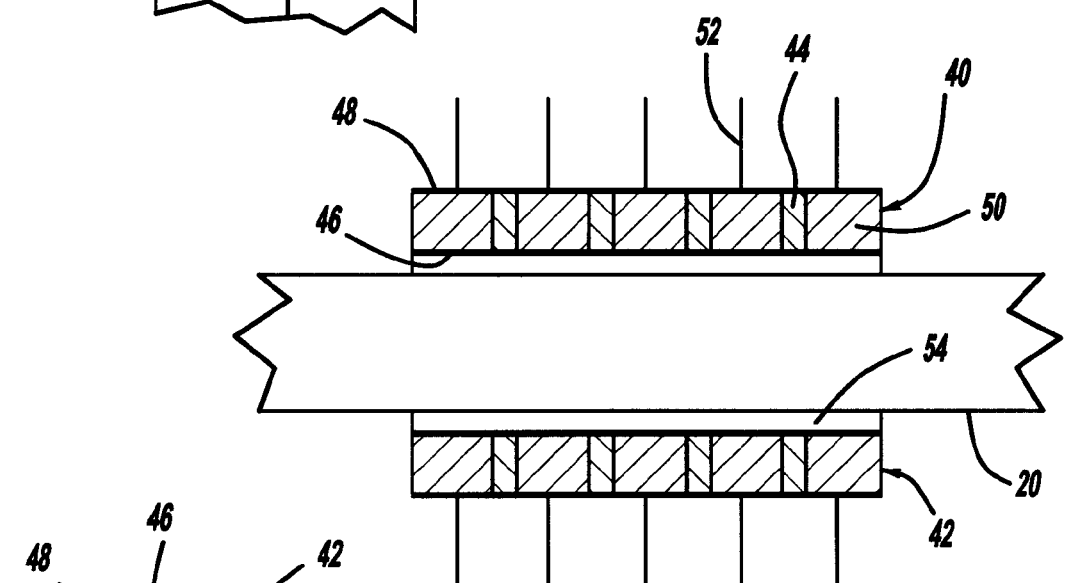
FIG. 3 is a length-wise cross-sectional view of a plurality of PTC ceramic ring heaters positioned around a hydrogen supply line in the fuel cell system shown in FIG. 1.
Figure 4:
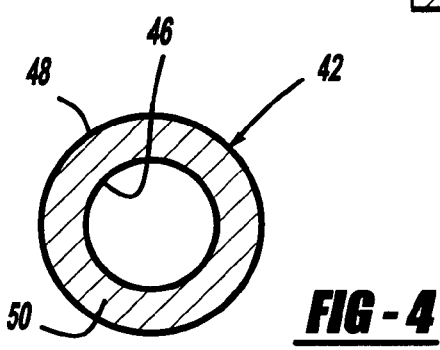
FIG. 4 is a cross-sectional view through one of the PTC ceramic ring heaters shown in FIG. 3.

According to the present invention, the PTC heater assembly 40 provides the desired heating of the hydrogen reactant gas flow through the supply line 20 without requiring regulation of the heater assembly 40. FIG. 3 is a cross-sectional view through line 3-3 and FIG. 4 is a cross-sectional view through line 4-4 of the PTC heater assembly 40. The heater assembly 40 includes a plurality of PTC ceramic heater rings 42 separated by electrically insulating ring spacers 44. The heater rings 42 include an inner electrical contact 46 and an outer electrical contact 48 and a ceramic body 50 therebetween. As discussed above, the ceramic body 50 is a ceramic composite that is designed to increase its resistance significantly once it reaches a predetermined temperature set by the composition of the ceramic material. An electric cable 52 provides an electrical current to the ceramic body 50 through the contacts 46 and 48 that causes the body 50 to provide heat as long as its temperature is below the predetermined temperature. A heat conducting tube 54 is positioned between the heater assembly 40 and the supply line 20. The supply line 20 can be made of any suitable material for the purposes described herein. However, materials having a high thermal transfer, such as stainless steel and aluminum, may be better for heat transfer purposes. The ceramic body 50 is able to be formed in any desirable shape and dimension. In this design, the inner diameter of the ceramic body 50 may be on the order of 5 mm.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising a fuel cell stack including end plates at opposing ends of the fuel cell stack, said fuel cell stack further including at least one positive temperature coefficient (PTC) ceramic heater for heating the fuel cell stack, said at least one PTC ceramic heater including a ceramic body being made of a ceramic material and electrodes, said electrodes being responsive to an electrical current to cause the ceramic body to provide heat, said ceramic material in the ceramic body being designed to provide heat up unto a predetermined temperature at which the resistance of the ceramic body goes up, significantly reducing the ceramic bodies heat generation capability.

2. The system according to claim 1 wherein the at least one PTC ceramic heater is a ring heater positioned in a housing of the fuel cell stack.

3. The system according to claim 2 wherein the at least one PTC ceramic heater is positioned in the end plates of the fuel cell stack.

4. The system according to claim 3 wherein the at least one PTC ceramic heater is positioned in a recess between two end plates at each end of the fuel cell stack.

5. The system according to claim 4 wherein the recess is formed in the end plates by a stamping process or a molding process.

6. The system according to claim 4 wherein the at least one PTC ceramic heater is a plurality of PTC ceramic heaters disposed in a predetermined configuration between the end plates of the fuel cell stack.

7. The system according to claim 1 further comprising a hydrogen source, a hydrogen supply line in fluid communication with the hydrogen source and the fuel cell stack, and a PTC ceramic heater assembly positioned in contact with the hydrogen supply line so as to heat the hydrogen from the hydrogen source.

8. The system according to claim 7 wherein the PTC ceramic heater assembly includes a plurality of spaced apart ceramic ring heaters disposed around the supply line.

9. The system according to claim 8 further comprising a heat conducting metal positioned between the ring heaters and the supply line.

10. The system according to claim 7 wherein the hydrogen source is a compressed hydrogen tank.

11. The system according to claim 1 wherein the fuel cell system is on a vehicle.

12. A fuel cell system comprising:
a hydrogen source;
fuel cell stack;
a hydrogen supply line coupled to the hydrogen source and the fuel cell stack;
a positive temperature coefficient (PTC) ceramic heater assembly positioned in contact with the hydrogen supply line so as to heat the hydrogen from the hydrogen source, wherein the PTC ceramic heater assembly includes a plurality of spaced apart ceramic ring heaters disposed concentrically around the supply line; and
a heat conducting metal positioned between the ring heaters and the supply line.

13. The system according to claim 12 wherein the hydrogen source is a compressed hydrogen tank.

14. The system according to claim 12 wherein the fuel cell system is on a vehicle.

15. A fuel cell system comprising:
a fuel cell stack including opposing end plates at both ends of the fuel cell stack, said fuel cell stack further including a plurality of positive temperature coefficient (PTC) ceramic heaters for heating the fuel cell stack, said PTC ceramic heaters being positioned with recesses in the opposing end plates, each of the PTC ceramic heater including a ceramic body being made of a ceramic material and electrodes, said electrodes being responsive to an electrical current to cause the ceramic body to provide heat, said ceramic material in the ceramic body being designed to provide heat up unto a predetermined temperature at which the resistance of the ceramic body goes up, significantly reducing the ceramic bodies heat generation capability;
a compressed hydrogen storage tank;
a hydrogen supply line coupled to the hydrogen source and the fuel cell stack; and
a PTC ceramic heater assembly positioned in contact with the hydrogen supply line so as to heat the hydrogen from the hydrogen source, said PTC heater assembly including a plurality of spaced apart ceramic ring heaters disposed around the supply line.

16. The system according to claim 15 wherein the plurality of PTC ceramic heaters are ring heaters positioned in the recess between the opposing end plates at each end of the fuel cell stack.

17. The system according to claim 15 further comprising a heat conducting metal positioned between the ring heaters in the PTC ceramic heater assembly.

18. The system according to claim 15 wherein the fuel cell system is on a vehicle.

* * * * *